US008970610B2

United States Patent
Herrmann et al.

(10) Patent No.: US 8,970,610 B2
(45) Date of Patent: Mar. 3, 2015

(54) PIXEL DATA PROCESSING APPARATUS AND METHOD OF PROCESSING PIXEL DATA

(75) Inventors: Stephan Herrmann, Markt Schwaben (DE); Michael Deur, Leander, TX (US); Norbert Stoeffler, Graefelfing (DE)

(73) Assignee: Freescale Semiconductor, Inc., Austin, TX (US)

( * ) Notice: Subject to any disclaimer, the term of this patent is extended or adjusted under 35 U.S.C. 154(b) by 177 days.

(21) Appl. No.: 13/500,362

(22) PCT Filed: Nov. 2, 2009

(86) PCT No.: PCT/IB2009/054849
§ 371 (c)(1), (2), (4) Date: Apr. 5, 2012

(87) PCT Pub. No.: WO2011/051756
PCT Pub. Date: May 5, 2011

(65) Prior Publication Data
US 2012/0268472 A1 Oct. 25, 2012

(51) Int. Cl.
G06T 1/00 (2006.01)
H03K 19/173 (2006.01)
G06F 9/32 (2006.01)
(52) U.S. Cl.
CPC ..................................... *G06F 9/325* (2013.01)
USPC ............................................ 345/522; 326/38
(58) Field of Classification Search
None
See application file for complete search history.

(56) References Cited

U.S. PATENT DOCUMENTS

| 6,384,831 | B1 | 5/2002 | Nakamura et al. | |
|---|---|---|---|---|
| 7,236,500 | B1 * | 6/2007 | Greenberg | 370/466 |
| 7,461,234 | B2 | 12/2008 | Ray | |
| 2002/0033827 | A1 | 3/2002 | Nakamura et al. | |
| 2002/0085007 | A1 * | 7/2002 | Nelson et al. | 345/505 |
| 2004/0008201 | A1 * | 1/2004 | Lewis | 345/522 |
| 2005/0257024 | A1 * | 11/2005 | Ray et al. | 712/11 |
| 2006/0039602 | A1 | 2/2006 | Isakharov | |
| 2007/0223043 | A1 | 9/2007 | Sugimoto | |
| 2008/0258760 | A1 * | 10/2008 | Sullam et al. | 326/38 |

OTHER PUBLICATIONS

Herrmann Stephan: "A Model for the Description and Implementation of Image Analysis Functions" Munich, Technical University of Munich, 2005, pp. 1-151.
Deng An-Te: "Flexible ASIC Design Using the Block Data Flow Paradigm (BDFP)" Department of Electrical and Computer Engineering, Raleigh, 2002, pp. 1-127.
Benkrid: "High Performance Reconfigurable Computing: From Applications to Hardware" Senior Member, IEEE, IAENG International Journal of Computer Science, 35:1, IJCS_35_1_04, pp. 1-8.
International Search Report and Written Opinion correlating to PCT/IB2009/054849 dated Jul. 30, 2010.

* cited by examiner

*Primary Examiner* — Joni Richer
*Assistant Examiner* — Yi Wang

(57) ABSTRACT

A pixel data processing apparatus comprises a data path unit comprising a hardware module dedicated to performing, when in use, predetermined functionality in relation to image data. The apparatus also comprises a data store for storing image data and a programmable engine. The programmable engine is arranged to route, when in use, data associated with the image data through the data path unit in a predetermined manner.

19 Claims, 3 Drawing Sheets

PIXEL DATA PROCESSING APPARATUS AND METHOD OF PROCESSING PIXEL DATA

FIELD OF THE INVENTION

This invention relates to a pixel data processing apparatus of the type that, for example, performs an image processing operation in relation to image data. This invention also relates to a method of processing pixel data of the type that, for example, performs an image processing operation in relation to image data.

BACKGROUND OF THE INVENTION

In the field of data processing, in particular but not exclusively in relation to image processing, it is known to capture image data, for example via a digital camera, and subject to the captured image data to one or more digital signal processing techniques. For example, in relation to automotive applications, such as so-called Advanced Driver Assistance Systems (ADASs), it is necessary to process captured image data in order for an ADAS to recognise delineation of a driving lane or a road turning. Similarly, in relation to surveillance applications, it is desirable to detect changes to a portion of an image captured in respect of a location or Region Of Interest (ROI) being monitored.

As part of an image processing process, image data is typically subjected to one or more image processing operators or filters, for example a Sobel operator for edge detection. In this respect, it is known to implement a so-called vision accelerator system in hardware that possesses a fixed and limited range of filters and operators. Such hardware comprises a memory for storing image data and is coupled to a memory bus. A number of hardware image processing engines are coupled to the memory bus, a Central Processing Unit (CPU) also being coupled to the memory bus and a control bus. Each image processing engine is capable of carrying out a different image processing operation, for example a Sobel operation or an absolute/angle transformation of the gradient. Whilst such an implementation is efficient with respect to minimising function calls, the pure hardware approach is inflexible, for example where additional functionality is required of the hardware implementation for different applications, such as different filtering functionality is required of the hardware implementation that is not supported by the hardware implementation.

In order to mitigate the shortcomings of the pure hardware implementation, it is known to provide a software-based vision accelerator. Whilst such vision accelerators provide flexibility of operation such flexibility comes at a penalty of requiring a high number of repeated calls of a same instruction sequence defining a function. In this respect, three instructions blocks are required per call: to retrieve data, to perform an operation, and to store the data afterwards. Furthermore, $10^5$ to $10^6$ calls, for example, of the instruction sequence are required. Consequently, execution speed and hence performance of the software-based vision accelerator is undesirably poor and also has a power consumption penalty associated with it.

SUMMARY OF THE INVENTION

The present invention provides a pixel data processing apparatus as described in the accompanying claims. The present invention also provides a method of processing pixel data as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
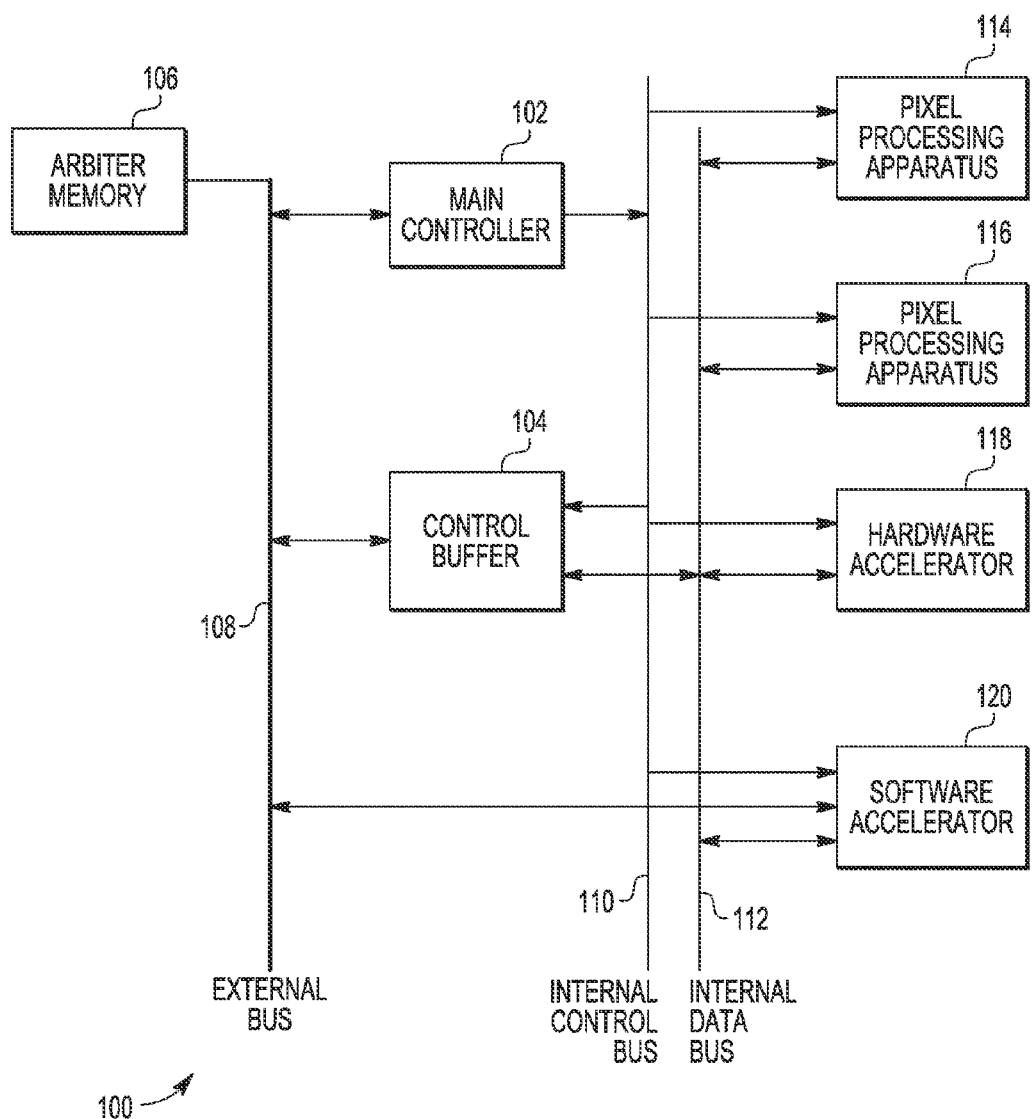
FIG. 1 schematically shows an example of an embodiment of a vision acceleration apparatus.

Throughout the following description, identical reference numerals will be used to identify like parts.

Because the embodiments of the present invention described below by way of example, are, for the most part, composed of electronic components and circuits known to those skilled in the art, circuit details will not be explained in any greater extent than that considered necessary, for the understanding and appreciation of the underlying concepts of the present invention and in order not to obfuscate or distract from the teachings of the present invention.

Referring to FIG. 1, a vision acceleration apparatus 100 for processing image data, for example by supporting an image processing operation or function, may comprise a main controller 102 and a central memory buffer 104 coupled to an external memory arbiter 106 via an external data bus 108. The main controller 102 and the central memory buffer 104 are also coupled to an internal control bus 110. The central memory buffer 104 may be further coupled to an internal data bus 112. A flexible sequential processing unit, for example a pixel processing apparatus 114, and another flexible sequential processing unit, for example another pixel processing apparatus 116, are each separately coupled to the internal control bus 110 and the internal data bus 112. For completeness and maximum flexibility, in this example a hardware accelerator 118 and a software accelerator 120 are also each separately coupled to the internal control bus 110 and the internal data bus 112. The hardware accelerator 118 may be a hardware implementation of known type used to support a known set of common image processing functions as discussed above, and the software accelerator 120 may be a software implementation of known type used to implement another set of programmable common image processing functions as discussed above.

Figure 2:
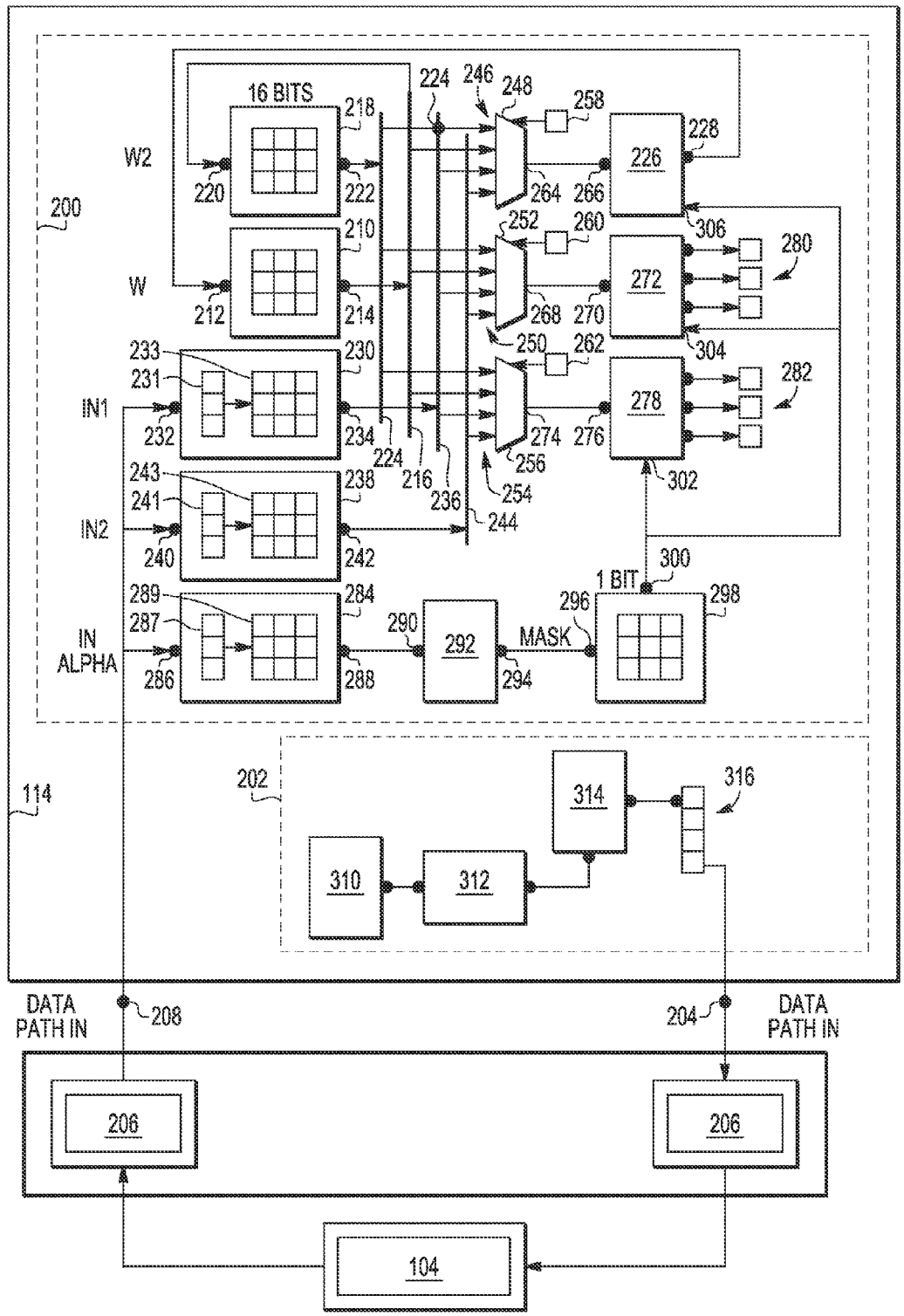
FIG. 2 schematically shows an example of an embodiment of a pixel processing apparatus of FIG. 1.

Turning to FIG. 2, the pixel processing apparatus 114 (and in this example the another pixel processing apparatus 116) may be implemented as a system on chip (SoC), for example in silicon, and may comprise a data path unit 200 and a programmable engine 202, an output 204 of the pixel processing apparatus 114 being coupled to the central memory buffer 104 via a streaming interface 206. In this example, the central memory buffer 104 is a Static Random Access Memory (SRAM), although other suitable types of memory can be employed. An input 208 of the pixel processing apparatus 114 may also be coupled to the central memory buffer 104 via the streaming interface 206. The streaming interface 206 serves to perform a Direct Memory Access (DMA) type of memory access. In this respect, the streaming interface 206 is an example of a Central Processing Unit (CPU)-independent memory access module.

The data path unit 200 may comprise a first two-dimensional (2D) working buffer, for example a first 3×3 matrix working buffer 210, having an input 212 and an output 214, the output 214 being coupled to a first internal multiplexing bus 216.

The data path unit 200 also may comprise a second, optional, 2D working buffer, for example a second 3×3 matrix working buffer 218, having an input 220 and an output 222, the output 222 being coupled to a second internal multiplexing bus 224. The first internal multiplexing bus 216 may be coupled to the input 220 of the second matrix working buffer 218.

A matrix Arithmetic Logic Unit (ALU) 226 may also be provided as part of the data path unit 200 and has an output 228 coupled, in this example, to the input 212 of the first matrix working buffer 210. The matrix ALU 226 supports, in this example, the following operations: copy, copy_to_all, add, add_val, shift, val_shift, negate, abs, clip and/or threshold. However, the skilled person should appreciate that other operations can be supported by the matrix ALU 226 in addition to the operations mentioned above or as an alternative to one or more of the operations mentioned above. Indeed, all the operations mentioned above need not be supported by the matrix ALU 226.

The data path unit 200 also may comprise a first 2D input buffer 230 having an input 232 coupled to the input 208 of the pixel processing apparatus 114 and an output 234 coupled to a third internal multiplexing bus 236. The first 2D input buffer 230 may comprise a first 3×1 pre-fetch buffer 231 coupled to a first 3×3 input window data matrix 233. Additionally, in this example, the data path unit 200 may comprise a second 2D input buffer 238 having an input 240 coupled to the input 208 of the pixel processing apparatus 114 and an output 242 coupled to a fourth internal multiplexing bus 244. The second 2D input buffer 238 may comprise a second 3×1 pre-fetch buffer 241 coupled to a second 3×3 input window data matrix 243.

The first and second matrix working buffers 210, 218 are used, in this example, to hold data corresponding, by position, to data temporarily stored for processing in, for example, the first 2D input buffer 230 and/or the second 2D input buffer 238. The first matrix working buffer 210 and/or the second matrix working buffer 218 can be used to store intermediate results generated during execution of an image processing function, for example a morphological gradient function.

The first, second, third and fourth internal multiplexing buses 216, 224, 236, 244 are coupled to a first quad input port 246 of a first multiplexer 248, to a second quad input port 250 of a second multiplexer 252 and to a third quad input port 254 of a third multiplexer 256. The first multiplexer 248 may be coupled to a first configuration register 258, the second multiplexer 252 may be coupled to a second configuration register 260, and the third multiplexer 256 may be coupled to a third configuration register 262. The first, second and third multiplexers 248, 252, 256 are also part of the data path unit 200. A first output 264 of the first multiplexer 248 may be coupled to an input 266 of the matrix ALU 226. A second output 268 of the second multiplexer 252 may be coupled to an input 270 of an adder tree module 272 of the data path unit 200, the adder tree module 272 constituting a hardware module dedicated to performing predetermined functionality in relation to image data, for example a logic circuit. In this example, the predetermined functionality may be permanent and may not be re-configured. A third output 274 of the third multiplexer 256 may be coupled to an input 276 of a sorting tree module 278 of the data path unit 200 and also constitutes another hardware module dedicated to performing predetermined functionality in relation to image data, for example another logic circuit. In this example, the predetermined functionality may be permanent and may not be re-configured.

The adder tree module 272 may comprise a number of peripheral registers 280 for storing output data resulting from the functionality of the adder tree module 272, for example so-called sum, clipped sum, threshold and/or scale operations. Similarly, the sorting tree module 278 may comprise another number of peripheral registers 282 for storing output data resulting from the functionality of the sorting tree module 278, for example so-called min, max, median, arg min and/or arg max operations. The adder tree module 272 and the sorting tree module 278 are, in this example, memory mapped and are examples of application field specific memory mapped processing units.

The data path unit 200 also may comprise a third 2D input buffer 284 having an input 286 coupled to the input 208 of the pixel processing apparatus 114 and an output 288 coupled to an input 290 of a mask processor 292. The third 2D input buffer 284 may comprise a third 3×1 pre-fetch buffer 287 coupled to a third 3×3 input window data matrix 289. An output 294 of the mask processor 292 may be coupled to an input 296 of a third 3×3 working buffer 298, an output 300 of the third working buffer 298 being coupled to another input 302 of the sorting tree module 278. The output 300 of the third working buffer 298 may also be coupled to another input 304 of the adder tree module 272 and another input 306 of the matrix ALU 226.

Turning to the programmable engine 202, the programmable engine 202 is, in this example, a CPU and may comprise an instruction memory 310, for example a Random Access Memory (RAM), coupled to an instruction decoder unit 312. The instruction decoder unit 312 may be coupled to an ALU 314, the ALU 314 being coupled to a buffer, for example general purpose registers 316 of the programmable engine 202. The general purpose registers 316 are coupled to the output 204 of the pixel processing apparatus 114.

Operation of the above described pixel processing apparatus 114 will now be described in the context of a morphological gradient function typically used in relation to processing of image data. For the sake of clarity and conciseness of description only one example of a relatively simple function is described herein. However, the skilled person should appreciate that many other functions can be implemented by the pixel processing apparatus 114 described above, for example: a Sobel operand, an absolute/angle transformation, a linear filter, a 3×3 filter with Gaussian function, or any other suitable type of filter.

Figure 3:
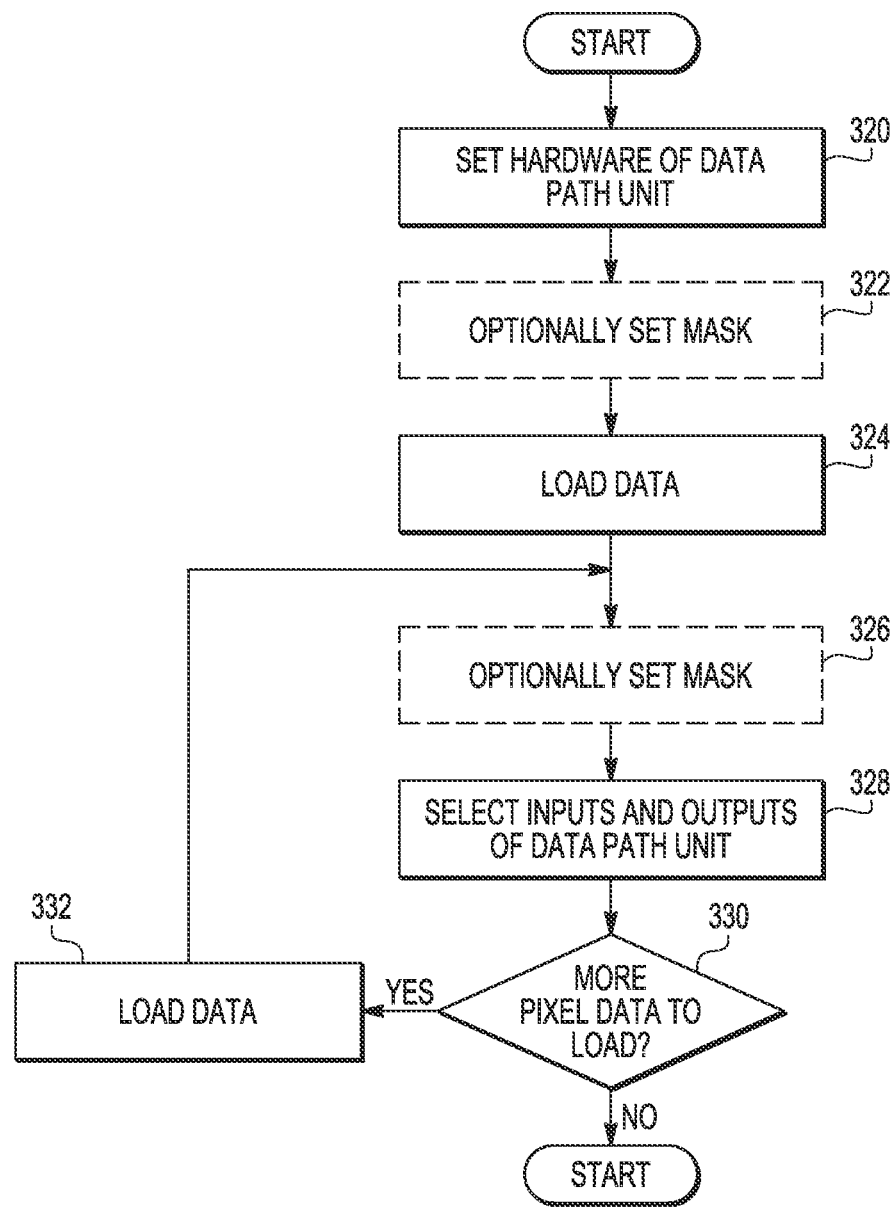
FIG. 3 is a flow diagram of a method of operation of the pixel processing apparatus of FIG. 2.

In operation (FIG. 3), image data may be stored in the central memory buffer 104 for processing on a pixel-by-pixel basis. Additionally, instructions are stored in the instruction memory 310 of the programmable engine 202 to control routing of image data through the data path unit 200 in order to use the application field (domain) specific memory mapped processing units mentioned above to implement, in this example, the morphological gradient function. The programmable engine 202 also processes the image data where appropriate. An example of the instructions stored in the instruction memory 310, expressed as pseudo code instructions, to implement the morphological gradient function is set out below:

```
Prolog:
    /* configure input multiplexer 276 of sorting tree 278 to use input
    matrix 233 */
    sel sort_input In1
    /* optional for mgrad in object */
    /* configure mask processor 292 */
    sel maskval 1
    /* configure sorting tree 278 to use only input pixels enabled by mask
    working buffer 298 */
    sel masksel
    /* pipe in the first two pixels without moving results writing */
    Skip
    Skip
Pixel:
    /* optional */
    /* store results from mask processor 292 in mask working matrix 298
    */
    set mask
    /* none optional */
    /* get the max and min results 282 from sorting tree 278, compute
max - min in the ALU 314 and store the result in the output buffer 316 */
    sub out,max,min
    /* proceed to the next pixel: shift data in input matrix 1 233 by one
position, move data from prefetch buffer 231 to input matrix 1 233, and
stream out the value in output buffer 316 via the streaming interface 206
to the central buffer 104 and jump back to "Pixel" stage above */
    next Pixel
```

The pseudo code instructions have two parts: a first configuration part, which may be called only once, and a second iteration loop part, which may be executed for each pixel. The configuration part may be:

Prolog:
sel sort_input In1
sel maskval 1
sel masksel
Skip
Skip

The iteration loop part may be:
Pixel:
set mask
sub out,max,min
next Pixel

Turning to the configuration loop part, the first instruction (sel sort_input In1) sets (Step 320) the third multiplexer 256 so that the first 2D input buffer 230 may be operably coupled to the sorting tree module 278. If only data relating to certain pixels are required for execution in relation to the morphological gradient function, the mask processor 292 can be employed (sel maskval 1; sel masksel), although use of the mask processor 292 is optional (Step 322). Data may then be loaded (skip; skip) into the first 2D input buffer 230 (Step 324) via the first pre-fetch buffer 231 for processing by the sorting tree module 278. In this example, data is initially loaded from the central memory buffer 104 under the control of the programmable engine 202 as a 2D data matrix. However, when data relating to a pixel is processed, it is important not to change the data contained in the 3×3 input window data matrix 233 during processing. In order to ensure efficient flow of data into the data path unit 200, so-called "pre-fetching" may be employed. Hence, as intimated above, the data may be loaded as 3×1 units of data into the pre-fetch buffer 231 for passage to the 3×3 input window data matrix 233 until the 3×3 input window matrix 233 is full and the content thereof is ready for processing. The streaming interface 206 retrieves the next data to be processed from the central memory buffer 104 and stores the retrieved next data in the pre-fetch buffer 231. Once processing of pixel data progresses to a subsequent pixel, the data in the 3×3 input window data matrix 233 may be moved, for example by one column to the right, and a new column of data may be simultaneously moved into the 3×3 input window data matrix 233 from the pre-fetch buffer 231.

The execution of the configuration loop may then be complete and execution passes on to the iteration loop. In the iteration loop, the mask selected in the configuration loop is optionally set (set mask) (Step 326) and the outputs of the max and min outputs at the peripheral registers 282 of the sorting tree module 278 are selected and the identity of an input in the data path unit 200 may be specified (Step 328) for routing of the output data (sub out,max,min) in a manner that achieves implementation of the morphological gradient function (max-min). Assuming further data needs to be processed, the iteration loop then loads (Steps 330, 332) subsequent pixel data (next Pixel) from the central memory buffer 104 into the first 2D input buffer 230 via the pre-fetch buffer 231. In this respect, the programmable engine 202 has a dedicated instruction or instructions to progress from one data set relating to, for example, one pixel to another data set relating to, for example, another pixel. For example, the programmable engine 202 employs, in this example, a "next" instruction that causes the instruction decoder unit 312 to jump back to a beginning of an instruction set relating to an image processing operation and conditionally to position shift or progress data in the first 2D input buffer 230 and/or the second 2D input buffer 238, an x-position counter for counting the number of pixels in an x-axis of the second 2D input buffer 238 so that processing of the last pixel in a row of the 2D input buffer 238 can be determined, and an output data stream when data may be moved from the general purpose registers 316 to the central memory buffer 104.

The iteration loop may be repeated until all image data stored in the central memory buffer 104 to which the morphological gradient function needs to be applied has been processed (Steps 330, 332). Hence, data relating to the image data may be routed through the data path unit 200 in a predetermined manner in order to achieve processing of the data such that the min and max (or other) functions are obtained in relation to pixel data. In this respect, for example, data at an output of the data path unit 200, such as an application field specific memory mapped processing unit, may be communicated or moved to an input of the application field specific memory mapped processing unit or another hardware module of the data path unit 200 or the programmable engine 202 for processing, for example the ALU 314 for performing the subtraction required to calculate the morphological gradient (max-min). The routing of the image data in the predetermined manner is, in this example, dictated by the instructions executed, for example by the programmable engine 202. The ALU 314 is an example of a logic unit and serves to support generic processing and/or routing of data that is not supported by the data path unit 200.

In some examples, the general purpose registers 316 are used to hold data being processed temporarily during routing of the data associated with the image data, for example intermediate processing results. Indeed, in this example, internal registers, for example the general purpose registers 316, are only employed as they provide adequate storage capacity and so external memory may not be used. In this respect, inputs and outputs of the data path unit 200 can be mapped as resisters in the general purpose registers 316. However, the skilled person should appreciate that where a greater storage facility is required, external storage, for example, a Static Random Access Memory (SRAM) or register file, implemented as a technology library macro cell, external to the programmable engine 202, can be employed. If supported, inputs and outputs of the data path unit 200 can be mapped in the "address space" of the programmable engine 202, for example as registers of the internal register file or as registers mapped into the data RAM address space or dedicated I/O port address space. For the avoidance of doubt, a load instruction is required to retrieve data from an external memory or I/O port; this is in contrast to internal registers, which do not have an access delay associated therewith.

The skilled person should appreciate that the image processing apparatus 114 is a hybrid combination of hardware implemented application field specific register or memory mapped processing units and a firmware module. The image processing apparatus 114, in particular the programmable engine 202, routes data through the data path unit 200 in, for example, a sequential manner by streaming the data through the data path unit 202. This is most easily achieved by using the "move" addressing instruction.

It is thus possible to provide an apparatus and method that provides greater flexibility in terms of supporting a greater range of processing operations than supported by pure hardware implementations, but not at the expense of requiring as large a number of function calls as software implementations. Hence, the speed of execution of the apparatus and method is better than the software implementation and less power is consumed. Furthermore, fewer parameters are required to specify addressing operations and the implementation of the apparatus occupies less semiconductor "real estate" than software implementations, for example due to small instructions and small data memories being employed, resulting in a saving of die space. Additionally, the apparatus and method provide greater flexibility in combining image processing functions and in defining pixel processing functions. The apparatus thus combines the advantages of both, hardware and software implementations. Application field specific tasks, for example the data streaming or sorting functions are performed in hardware, such as in the data path unit 200, while tasks requiring more flexibility in combining elementary processing steps (for example, the "max,", "minus", "min" functions) are performed using programs executed by a programmable engine.

Of course, the above advantages are exemplary, and these or other advantages may be achieved by the invention. Further, the skilled person will appreciate that not all advantages stated above are necessarily achieved by embodiments described herein.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

The connections as discussed herein may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connection carrying multiple signals may be separated out into various different connections carrying subsets of these signals. Therefore, many options exist for transferring signals.

Although the invention has been described with respect to specific conductivity types or polarity of potentials, skilled artisans appreciated that conductivity types and polarities of potentials may be reversed.

Furthermore, some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also, for example, in one embodiment, the illustrated elements of the data path unit 200 are circuitry located on a single integrated circuit or within a same device. Alternatively, the data path unit 200 may include any number of separate integrated circuits or separate devices interconnected with each other. For example, the adder tree module 272 may be located on a same integrated circuit as the first and second 2D input buffers 230, 238 or on a separate integrated circuit or located within another peripheral or slave discretely separate from other elements of the data path unit 200. The programmable engine 202 may also be located on separate integrated circuits or devices.

All or some of the software described herein may be received elements of apparatus 114, for example, from computer readable media such as the memory 310 or other media on other computer systems. Such computer readable media may be permanently, removably or remotely coupled to an information processing apparatus such as the apparatus 114. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. For example, although the above examples have been described in the context of use of input buffers arranged as 3×3 matrices, the skilled person should appreciate that other configurations can be employed depending upon the application required of the image processing apparatus 114.

Also, for example, the instruction memory 310 described above can be a single ported or dual ported memory or register file. Where a dual-ported implementation is used, instructions for a second image processing function can be uploaded without interfering with image data being processed in accordance with instructions for a first image processing function. For example, while the image data is being filtered in accordance with a "1 2 1" low pass filter operation, instructions for a subsequent filter operation, to be performed on the results of the "1 2 1" low pass filter operation, are uploaded.

The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A pixel data processing apparatus, comprising:
a data path unit comprising:
an arithmetic logic unit configured to perform a first function on image data;
a working buffer configured to receive a result of the first function from the arithmetic logic unit; and
a first hardware module configured in a first mode to perform a second function on the image data, and in a second mode to receive the result from the working buffer and to perform the second function on the result of the first function; and
a programmable engine configured in the first mode to direct the data path unit to route the image data to the first hardware module, and in the second mode to direct the data path unit to route the image data to the arithmetic logic unit and to route the result of the first function from the working buffer to the first hardware module;
wherein the data path unit further comprises a mask processor configured to prevent the arithmetic logic unit from performing the first function on a particular pixel of the image data, and to prevent the first hardware module in the first mode from performing the second function on the particular pixel of the image data and in the second mode from performing the second function on the particular pixel of the result of the first function.

2. The apparatus as claimed in claim 1, further comprising:
an input buffer configured to receive the image data, wherein the input buffer provides the image data to the first hardware module in the first mode, and to the arithmetic logic unit in the second mode.

3. The apparatus as claimed in claim 2, wherein the data path unit further comprises:

a second hardware module configured in a third mode to perform a third function, and in a fourth mode to receive the result from the working buffer and to perform the third function on the result;
wherein the programmable engine is further configured in the third mode to direct the data path unit to route the image data to the second hardware module, and in the fourth mode to direct the data path unit to route the image data to the arithmetic logic unit and to route the result of the first function from the working buffer to the second hardware module.

4. The apparatus as claimed in claim 3, wherein the input buffer provides the image data to the second hardware module in the third mode, and to the arithmetic logic unit in the fourth mode.

5. The apparatus as claimed in claim 3, wherein the second hardware module is a sorting tree.

6. The apparatus as claimed in claim 1, wherein:
the programmable engine comprises a buffer; and
the programmable engine is further configured to direct the data path unit to route the result of the second function from the first hardware module to the buffer.

7. The apparatus as claimed in claim 1, wherein the image data is received from a buffer for centrally storing the image data, the buffer being accessible by a CPU-independent memory access hardware module.

8. The apparatus as claimed in claim 7, wherein the CPU-independent memory access hardware module is one of a Direct Memory Access (DMA) module coupled to the buffer and a streaming interface module coupled to the buffer.

9. The apparatus as claimed in claim 1, wherein the first hardware module is an adder tree.

10. A method of processing pixel data, comprising:
performing, by an arithmetic logic unit of a pixel data processing apparatus, a first function on image data;
providing a result of the first function to a working buffer of the pixel data processing apparatus;
directing, by a programmable engine of the pixel data processing apparatus:
in a first mode, a first hardware module of the pixel data processing apparatus, to perform a second function on the image data; and
in a second mode, the first hardware module to perform the second function on the result of the first function;
preventing, by by a mask processor, the arithmetic logic unit from performing the first function on a particular pixel of the image data; and
preventing, by the mask processor, the first hardware module in the first mode from performing the second function on the particular pixel of the image data and in the second mode from performing the second function on the particular pixel of the result of the first function.

11. A semiconductor device for processing pixel data, comprising:
a data path unit comprising:
an arithmetic logic unit configured to perform a first function on image data;
a working buffer configured to receive a result of the first function from the arithmetic logic unit; and
a first hardware module configured in a first mode to perform a second function on the image data, and in a second mode to receive the result from the working buffer and to perform the second function on the result of the first function; and
a programmable engine configured in the first mode to direct the data path unit to route to the first hardware module, and in the second mode to direct the data path unit to route the image data to the arithmetic logic unit and to route the result of the first function from the working buffer to the first hardware module;

wherein the data path unit further comprises a mask processor configured to prevent the arithmetic logic unit from performing the first function on a particular pixel of the image data, and to prevent the first hardware module in the first mode from performing the second function on the particular pixel of the image data and in the second mode from performing the second function on the particular pixel of the result of the first function.

12. The semiconductor device as claimed in claim 11, further comprising:

an input buffer configured to receive the image data, wherein the input buffer provides the image data to the first hardware module in the first mode, and to the arithmetic logic unit in the second mode.

13. The semiconductor device as claimed in claim 11, wherein the data path unit further comprises:

a second hardware module configured in a third mode to perform a third function, and in a fourth mode to receive the result from the working buffer and to perform the third function on the result;

wherein the programmable engine is further configured in the third mode to direct the data path unit to route the image data to the second hardware module, and in the fourth mode to direct the data path unit to route the image data to the arithmetic logic unit and to route the result of the first function from the working buffer to the second hardware module.

14. The semiconductor device as claimed in claim 13, wherein the input buffer provides the image data to the second hardware module in the third mode, and to the arithmetic logic unit in the fourth mode.

15. The semiconductor device as claimed in claim 13, wherein the second hardware module is a sorting tree.

16. The semiconductor device as claimed in claim 11, wherein:

the programmable engine comprises a buffer; and
the programmable engine is further configured to direct the data path unit to route the result of the second function from the first hardware module to the buffer.

17. The semiconductor device as claimed in claim 11, wherein the image data is received from a buffer for centrally storing the image data, the buffer being accessible by a CPU-independent memory access hardware module.

18. The semiconductor device as claimed in claim 17, wherein the CPU-independent memory access hardware module is one of a Direct Memory Access (DMA) module coupled to the buffer and a streaming interface module coupled to the buffer.

19. The semiconductor device as claimed in claim 11, wherein the first hardware module is an adder tree.

* * * * *